US 12,197,282 B2

(12) United States Patent
Li et al.

(10) Patent No.: US 12,197,282 B2
(45) Date of Patent: Jan. 14, 2025

(54) DATA RECOVERY METHOD FOR FLASH MEMORY

(71) Applicant: INSTITUTE OF MICROELECTRONICS, CHINESE ACADEMY OF SCIENCES, Beijing (CN)

(72) Inventors: Qianhui Li, Beijing (CN); Qi Wang, Beijing (CN); Liu Yang, Beijing (CN); Yiyang Jiang, Beijing (CN); Xiaolei Yu, Beijing (CN); Jing He, Beijing (CN); Zongliang Huo, Beijing (CN); Tianchun Ye, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/553,929

(22) PCT Filed: Apr. 8, 2021

(86) PCT No.: PCT/CN2021/085938
§ 371 (c)(1),
(2) Date: Oct. 4, 2023

(87) PCT Pub. No.: WO2022/213320
PCT Pub. Date: Oct. 13, 2022

(65) Prior Publication Data
US 2024/0220355 A1 Jul. 4, 2024

(51) Int. Cl.
*G06F 11/10* (2006.01)
*G06F 11/14* (2006.01)

(52) U.S. Cl.
CPC .......... *G06F 11/1008* (2013.01); *G06F 11/10* (2013.01); *G06F 11/1016* (2013.01);
(Continued)

(58) Field of Classification Search
CPC .. G06F 11/1008; G06F 11/10; G06F 11/1048; G06F 11/1016; G06F 11/102; G06F 11/1402
(Continued)

(56) References Cited

U.S. PATENT DOCUMENTS 9,342,404 B2 * 5/2016 Tseng .................. G06F 11/1068
10,628,082 B2 * 4/2020 Hsiao .................... G06F 3/0659
(Continued)

FOREIGN PATENT DOCUMENTS

| CN | 105913879 A | 8/2016 |
|---|---|---|
| CN | 110515760 A | 11/2019 |

OTHER PUBLICATIONS

English translation of International Written Opinion for PCT/CN2021/085938, Jan. 6, 2022, 4 pages. (Year: 2022).*
(Continued)

*Primary Examiner* — John J Tabone, Jr.
(74) *Attorney, Agent, or Firm* — Christopher R. Christenson; Kelly, Holt & Christenson, P.L.L.C.

(57) ABSTRACT

A data recovery method for a flash memory includes: reading data from the flash memory by using preset read voltage; calculating a check node error rate corresponding to the data; calculating a read voltage adjustment step size according to the check node error rate; adjusting the preset read voltage according to the read voltage adjustment step size and reading data from the flash memory by using the adjusted preset read voltage, and repeating the operation of calculating a check node error rate corresponding to the data to operation of adjusting the preset read voltage according to the read voltage adjustment step size and reading data from the flash memory by using the adjusted preset read voltage, until the check node error rate is minimum; and selecting a read voltage corresponding to the minimum check node
(Continued)

error rate to read data from the flash memory, so as to perform data recovery.

10 Claims, 11 Drawing Sheets

(52) U.S. Cl.
CPC ........ *G06F 11/102* (2013.01); *G06F 11/1048* (2013.01); *G06F 11/1402* (2013.01)

(58) Field of Classification Search
USPC ............ 714/773, 704, 774, 763; 365/185.09, 365/185.24, 185.33, 200, 201; 398/27
See application file for complete search history.

(56) References Cited

U.S. PATENT DOCUMENTS

| | | | | |
|---|---|---|---|---|
| 11,762,734 B2* | 9/2023 | Lee | ................... | H03M 13/3707 714/764 |
| 2014/0359202 A1* | 12/2014 | Sun | ......................... | G11C 7/14 365/185.11 |
| 2015/0169401 A1* | 6/2015 | Tseng | .................. | G06F 11/1068 714/773 |
| 2016/0372161 A1* | 12/2016 | Chae | ................. | H03M 13/6325 |
| 2017/0125111 A1* | 5/2017 | Sankaranarayanan | ....................... | G06F 11/0793 |
| 2020/0411110 A1* | 12/2020 | Getreuer | ............ | G11C 16/0483 |
| 2021/0224151 A1* | 7/2021 | Lee | ...................... | G11C 29/021 |
| 2024/0220355 A1* | 7/2024 | Li | ....................... | G06F 11/1048 |

OTHER PUBLICATIONS

International Search Report and Written Opinion for PCT application No. PCT/CN2021/085938, dated Jan. 6, 2022, 10 pages including English Translation.

\* cited by examiner

DATA RECOVERY METHOD FOR FLASH MEMORY

CROSS-REFERENCE TO RELATED APPLICATION

This application is a Section 371 National Stage Application of International Application No. PCT/CN2021/085938 filed on Apr. 8, 2021, entitled "DATA RECOVERY METHOD FOR FLASH MEMORY", the content of which is hereby incorporated by reference in its entirety.

TECHNICAL FIELD

The present disclosure relates to a field of a nonvolatile memory of a semiconductor integrated circuit, and in particular, to a data recovery method for a flash memory.

BACKGROUND

A flash memory, especially an NAND flash memory, is a kind of non-volatile memory, which is widely used in storage fields such as a mobile phone, a notebook computer, a cloud storage, etc. A basic function of the flash memory is to save data, and a basic requirement of a storage system is to ensure a consistency between written data and read data. An Error Correcting Code (ECC) may correct an error of the read data, which is an important means to ensure the consistency between the written data and the read data and improve a reliability of the storage system. However, the error correcting code also has a certain error correction range. If the read data has a high original error rate, the high original error rate may exceed an error correction ability of the error correcting code, and the written data may not be recovered correctly.

In a process of data storage, the flash memory may be affected by data retention noise. When data is stored in the flash memory for a period of time, a charge stored in a flash memory storage unit may leak, and a threshold voltage distribution state of the flash memory may shift to a side with a smaller threshold voltage. If a read operation is performed by using a read voltage used in an initial stage of the data storage, a problem that a bit error rate of the read data exceeds the error correction ability of the error correcting code may occur.

SUMMARY

The present disclosure provides a data recovery method for a flash memory, including: reading data from the flash memory by using a preset read voltage; calculating a check node error rate corresponding to the data; calculating a read voltage adjustment step size according to the check node error rate; adjusting the preset read voltage according to the read voltage adjustment step size and reading data from the flash memory by using the adjusted preset read voltage, and repeating the operation of calculating a check node error rate corresponding to the data to the operation of adjusting the preset read voltage according to the read voltage adjustment step size and reading data from the flash memory by using the adjusted preset read voltage, until the check node error rate is minimum; and selecting a read voltage corresponding to the minimum check node error rate to read data from the flash memory, so as to perform a data recovery.

Optionally, the method further includes: determining whether a current check node error rate is less than a preset threshold; and in response to the current check node error rate being less than the preset threshold, stopping the operation of adjusting the preset read voltage according to the read voltage adjustment step size and reading data from the flash memory by using the adjusted preset read voltage, so as to perform a data recovery with current read data.

Optionally, the method further includes: determining whether a current check node error rate is greater than a previous check node error rate, and in response to the current check node error rate being greater than the previous check node error rate, stopping the operation of adjusting the preset read voltage according to the read voltage adjustment step size and reading data from the flash memory by using the adjusted preset read voltage, so as to perform a data recovery with previous read data.

Optionally, the calculating a check node error rate corresponding to the data includes: calculating the check node error rate according to a formula:

$$R_C = \text{sum}(H \cdot D_k)/m$$

where $R_C$ is the check node error rate, H is a parity check matrix, $D_k$ is data of a read codeword, and m is the number of check nodes.

Optionally, the calculating a read voltage adjustment step size according to the check node error rate includes: establishing a functional relationship between the check node error rate and a bit error rate and a functional relationship between the bit error rate and the read voltage adjustment step size, based on a threshold voltage distribution state of the flash memory; establishing a functional relationship between the check node error rate and the read voltage adjustment step size according to the functional relationship between the check node error rate and the bit error rate and the functional relationship between the bit error rate and the read voltage adjustment step size; and calculating the read voltage adjustment step size according to the functional relationship between the check node error rate and the read voltage adjustment step size.

Optionally, the establishing a functional relationship between the check node error rate and a bit error rate and a functional relationship between the bit error rate and the read voltage adjustment step size includes: calculating a bit error rate corresponding to the preset read voltage, wherein the calculating a bit error rate corresponding to the preset read voltage includes: calculating the bit error rate according to a formula:

$$P_e = G_{\sigma_{i-1}}(R_{V_i} - \mu_{i-1}, +\infty) + G_{\sigma_i}(-\infty, R_{V_i} - \mu_i)$$

where $P_e$ is the bit error rate, i is a serial number of the threshold voltage distribution state, $R_{V_i}$ is an $i^{th}$ preset read voltage, $\mu_i$ is a mean value of an $i^{th}$ threshold voltage distribution state of the flash memory, $\mu_{i-1}$ is a mean value of an $(i-1)^{th}$ threshold voltage distribution state of the flash memory, $G_{\sigma_{i-1}}$ is a distribution function of Gaussian distribution corresponding to the threshold voltage distribution state with a mean value of 0 and a variance of $\sigma_{i-1}$, and $G_{\sigma_i}$ is a distribution function of Gaussian distribution with a mean value of 0 and a variance of $\sigma_i$.

Optionally, the $i^{th}$ preset read voltage and an $i^{th}$ optimal read voltage have a relationship:

$$R_{V_i} - R_{O_i} = D_{R_i}$$

where $R_{O_i}$ is the $i^{th}$ optimal read voltage, and $D_{R_i}$ is a read voltage adjustment step size between the $i^{th}$ preset read voltage and the $i^{th}$ optimal read voltage; and the $i^{th}$ optimal read voltage is calculated by:

$$R_{O_i} = c_{i-1}\mu_{i-1} + c_i\mu_i$$

$$c_{i-1} = \frac{\sigma_i}{\sigma_{i-1} + \sigma_i}, c_i = \frac{\sigma_{i-1}}{\sigma_{i-1} + \sigma_i}$$

where $\mu_i$ is the mean value of the $i^{th}$ threshold voltage distribution state, $\sigma_i$ is a variance of the $i^{th}$ threshold voltage distribution state, $\mu_{i-1}$ is the mean value of the $(i-1)^{th}$ threshold voltage distribution state, and $\sigma_{i-1}$ is a variance of the $(i-1)^{th}$ threshold voltage distribution state.

Optionally, the method further includes: quantizing the functional relationship between the check node error rate and the read voltage adjustment step size into a lookup table, and obtaining the read voltage adjustment step size by looking up the lookup table.

Optionally, the method further includes: establishing a functional relationship between a read voltage adjustment step size that between the $i^{th}$ preset read voltage and the $i^{th}$ optimal read voltage and a read voltage adjustment step size that between a $j^{th}$ preset read voltage and a $j^{th}$ optimal read voltage; and calculating, based on the functional relationship, the read voltage adjustment step size between the $j^{th}$ preset read voltage and the $j^{th}$ optimal read voltage according to the read voltage adjustment step size between the $i^{th}$ preset read voltage and the $i^{th}$ optimal read voltage.

Optionally, the selecting a read voltage corresponding to the minimum check node error rate to read data from the flash memory so as to perform a data recovery includes: performing the data recovery on the read data by using an error correcting code.

BRIEF DESCRIPTION OF THE DRAWINGS

Specific embodiments of the present disclosure will be further described in detail with reference to accompanying drawings.

In order to describe embodiments of the present disclosure or the technical solutions in the prior art more clearly, the accompanying drawings required to be used in the descriptions of the embodiments or the prior art will be briefly introduced below. It is obvious that the accompanying drawings in the following descriptions are only some embodiments of the present disclosure, and other accompanying drawings may also be obtained by those skilled in the art without any creative effort.

DETAILED DESCRIPTION OF EMBODIMENTS

Exemplary embodiments of the present disclosure will be described below in detail with reference to the accompanying drawings. The following embodiments are provided by way of examples, so as to fully convey the spirit of the present disclosure to those skilled in the art to which the present disclosure belongs. Therefore, the present disclosure is not limited to the embodiments disclosed herein.

Figure 1:
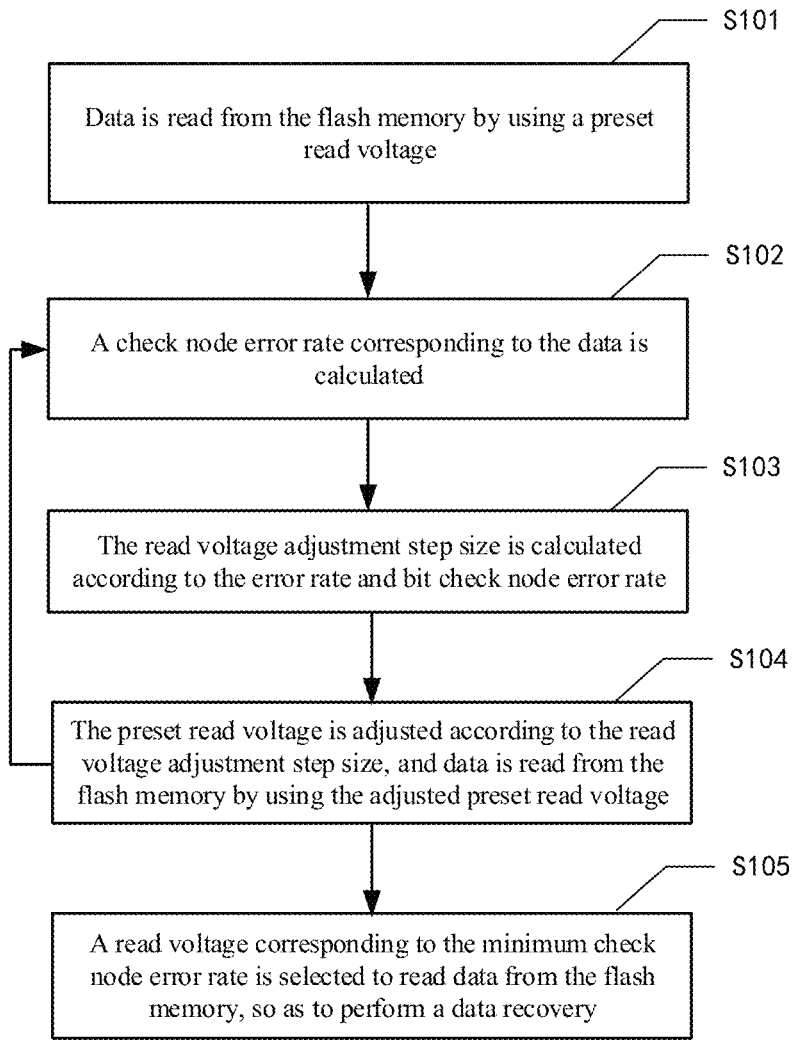
FIG. 1 schematically shows a flowchart of a data recovery method for a flash memory according to an embodiment of the present disclosure.

FIG. 1 schematically shows a flowchart of a data recovery method for a flash memory according to an embodiment of the present disclosure.

As shown in FIG. 1, the method may include, for example, operations S101 to S105.

In operation S101, data is read from the flash memory by using a preset read voltage.

The preset read voltage is generally set as an initial read voltage, that is, an optimal read voltage with data hold time of 0. The read data may refer to data written into an NAND flash memory after an ECC encoding and data read when a storage system performs a read operation.

In operation S102, a check node error rate corresponding to the data is calculated.

In operation S103, a read voltage adjustment step size is calculated according to the check node error rate.

The read voltage adjustment step size may also be called a decision distance, which refers to a voltage value adjusted each time in a process of adjusting the initial read voltage to the optimal read voltage.

In operation S104, the preset read voltage is adjusted according to the read voltage adjustment step size, and data is read from the flash memory by using the adjusted preset read voltage, and the process returns to operation S102.

After returning to operation S102, the process continues to perform operations S102 to S104, until the check node error rate is minimum.

In operation S105, a read voltage corresponding to the minimum check node error rate is selected to read data from the flash memory, so as to perform a data recovery.

In the data recovery method provided by the above-mentioned embodiments, the decision distance is calculated according to the check node error rate of the read data, and the read voltage is adjusted by using the decision distance as the read voltage adjustment step size. Data is read with a new read voltage after the read voltage is adjusted, and a check node error rate of read data of the new read voltage is calculated, and the decision distance is calculated according to the check node error rate. The process is repeated. The read voltage corresponding to the minimum check node error rate is selected as the optimal read voltage, so that the read voltage adjustment step size may be dynamically adjusted, extra read times required to find the optimal read voltage may be reduced, and time required for searching the optimal read voltage in a reread error correction algorithm may be reduced.

According to embodiments of the present disclosure, since the NAND flash memory uses a page as a minimum read unit, a page may contain a plurality of codewords in a practical engineering application. In such embodiments, a mean value of the check node errors rate of the codewords on a page is used as a check node error rate of a page. Specifically, a method of calculating a check node error rate may include, for example:

calculating the check node error rate according to a formula:

$$R_C = \text{sum}(H \cdot D_k)/m$$

where $R_C$ is the check node error rate, H is a parity check matrix, $D_k$ is data of a read codeword, which is a part of read page data, and m is the number of check nodes, which is also the total number of rows of H matrix.

Figure 2:
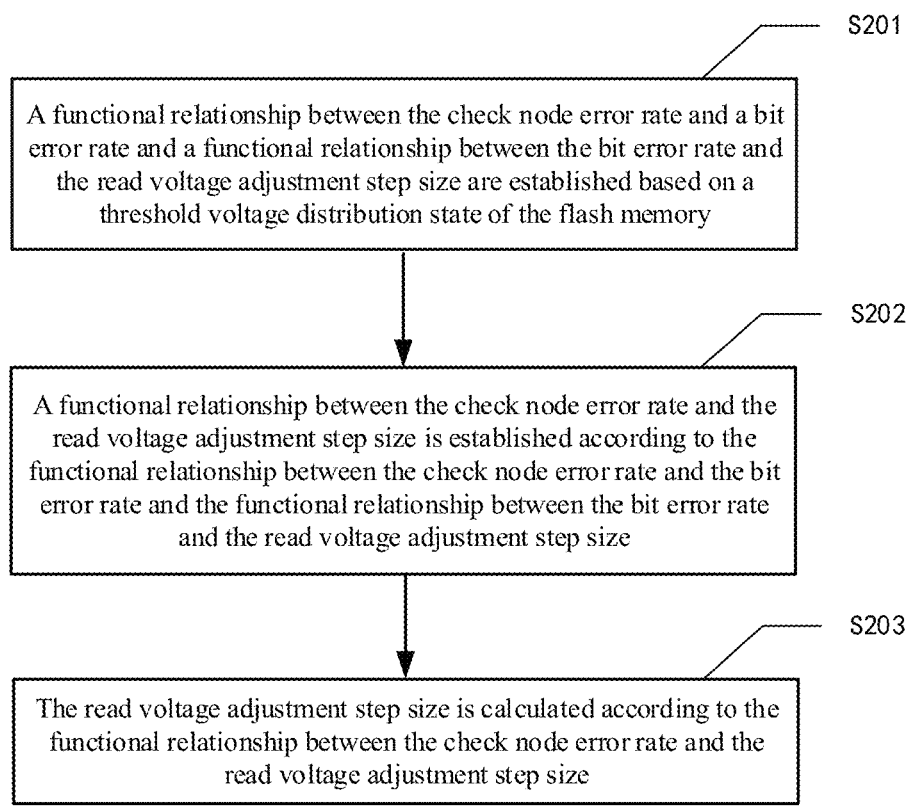
FIG. 2 schematically shows a flowchart of a method of calculating a read voltage adjustment step size according to a check node error rate according to an embodiment of the present disclosure.

FIG. 2 schematically shows a flowchart of a method of calculating a read voltage adjustment step size according to a check node error rate according to an embodiment of the present disclosure.

Figure 3:
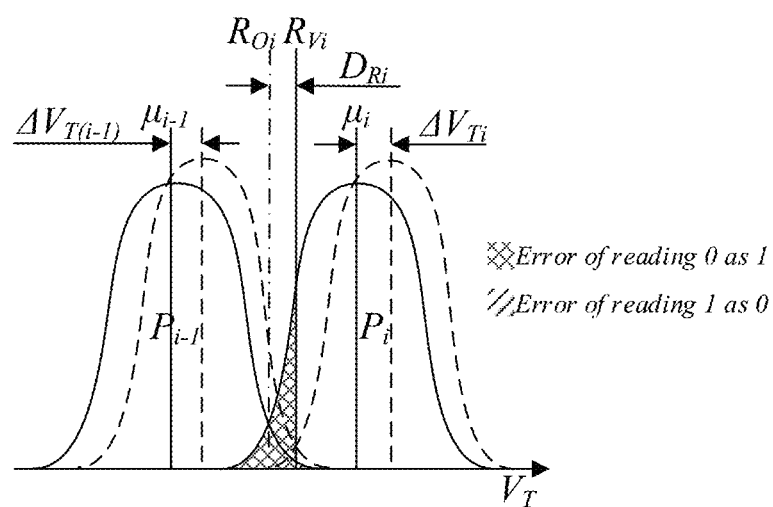
FIG. 3 schematically shows a diagram of a threshold voltage distribution state of an NAND flash memory according to an embodiment of the present disclosure.

FIG. 3 schematically shows a diagram of a threshold voltage distribution state of a flash memory according to an embodiment of the present disclosure.

According to embodiments of the present disclosure, as shown in FIG. 2, the method may include, for example, operations S201 to S203. In operation S201, a functional relationship between the check node error rate and a bit error rate and a functional relationship between the bit error rate and the read voltage adjustment step size are established based on a threshold voltage distribution state of the flash memory.

In general, a bit error rate of the NAND flash memory is related to the read voltage, as shown in FIG. 3. $R_{V_i}$ is an $i^{th}$ initial read voltage, which is generally the optimal read voltage with data hold time of 0, $R_{O_i}$ is an $i^{th}$ optimal read voltage, which is the read voltage with the minimum bit error rate of the read data and is also an intersection point of two threshold voltage distribution states after a period of data hold time, $P_i$ is an $i^{th}$ threshold voltage distribution state, $P_{i-1}$ is an $(i-1)^{th}$ threshold voltage distribution state, $\Delta V_T$ is a threshold voltage offset of the $i^{th}$ threshold voltage distribution state, $\Delta V_{T_{i-1}}$ is a threshold voltage offset of the $(i-1)^{th}$ threshold voltage distribution state, and $D_{R_i}$ is a read voltage adjustment step size between the $i^{th}$ preset read voltage and the $i^{th}$ optimal read voltage. A dotted-line portion may represent an initial threshold voltage distribution state of the flash memory. When data is stored in the flash memory for a period of time, a charge stored in the storage unit of the flash memory may leak, and the threshold voltage distribution state of the flash memory may shift to a side with a smaller threshold voltage, that is, the threshold voltage distribution state of the flash memory may move to a threshold voltage distribution state represented by a solid-line portion. An area of a shaded portion in FIG. 3 is the bit error rate of the read data of the NAND flash memory, and the area of the shaded portion may be solved by integrating the threshold voltage distribution state. Therefore, the bit error rate between two threshold voltage distribution states is also called a bit error rate at an $i^{th}$ read voltage.

In a process of establishing the functional relationship, it is required to calculate a bit error rate corresponding to the preset read voltage. Referring to FIG. 3, a method of calculating the bit error rate corresponding to the preset read voltage may include:

calculating the bit error rate according to a formula:

$$P_e = G_{\sigma_{i-1}}(R_{V_i} - \mu_{i-1}, +\infty) + G_{\sigma_i}(-\infty, R_{V_i} - \mu_i)$$

where $P_e$ is the bit error rate, i is a serial number of the threshold voltage distribution state, $R_{V_i}$ is an $i^{th}$ preset read voltage, $\mu_i$ is a mean value of an $i^{th}$ threshold voltage distribution state of the flash memory, $\mu_{i-1}$ is a mean value of an $(i-1)^{th}$ threshold voltage distribution state of the flash memory, $G_{\sigma_{i-1}}$ is a distribution function of Gaussian distribution corresponding to the threshold voltage distribution state with a mean value of 0 and a variance of $\sigma_{i-1}$, and $G_{\sigma_i}$ is a distribution function of Gaussian distribution with a mean value of 0 and a variance of $\sigma_i$.

The $i^{th}$ preset read voltage and an $i^{th}$ optimal read voltage have a relationship:

$$R_{V_i} - R_{O_i} = D_{R_i}$$

where $R_{O_i}$ is the $i^{th}$ optimal read voltage, and $D_{R_i}$ is a read voltage adjustment step size between the $i^{th}$ preset read voltage and the $i^{th}$ optimal read voltage; and the $i^{th}$ optimal read voltage is calculated by:

$$R_{O_i} = c_{i-1}\mu_{i-1} + c_i\mu_i$$
$$c_{i-1} = \frac{\sigma_i}{\sigma_{i-1} + \sigma_i}, c_i = \frac{\sigma_{i-1}}{\sigma_{i-1} + \sigma_i}$$

wherein, $\mu_i$ is the mean value of the $i^{th}$ threshold voltage distribution state, $\sigma_i$ is a variance of the $i^{th}$ threshold voltage distribution state, $\mu_{i-1}$ is the mean value of the $(i-1)^{th}$ threshold voltage distribution state, and $\sigma_{i-1}$ is a variance of the $(i-1)^{th}$ threshold voltage distribution state.

Specifically, a derivation process of the computational formula of the $i^{th}$ optimal read voltage includes:

modeling the threshold voltage distribution state shown in FIG. 3 as the Gaussian distribution, where an intersection point of two Gaussian distributions is the $i^{th}$ optimal read voltage, which may be represented by:

$$\frac{1}{\sigma_{i-1}}\exp\left(-\frac{(R_{O_i} - \mu_{i-1})^2}{2\sigma_{i-1}^2}\right) = \frac{1}{\sigma_i}\exp\left(-\frac{(R_{O_i} - \mu_i)^2}{2\sigma_i^2}\right)$$

To solve the above-mentioned equation, when:

$$\sigma_{i-1} \neq \sigma_i,$$

it may obtain:

$$R_{O_i} = \frac{\mu_i \cdot \sigma_{i-1}^2 - \mu_{i-1} \cdot \sigma_i^2 - \sigma_{i-1} \cdot \sigma_i \cdot s}{\sigma_{i-1}^2 - \sigma_i^2}$$

$$s = \sqrt{2\sigma_i^2 \ln\frac{\sigma_{i-1}}{\sigma_i} - 2\sigma_{i-1}^2 \ln\frac{\sigma_{i-1}}{\sigma_i} + (\mu_i - \mu_{i-1})^2}$$

However, in an actual NAND flash memory, due to:

$$\sigma_{i-1} \approx \sigma_i$$

such embodiments may be simplified by using the following formula:

Therefore, a representation method of the $i^{th}$ optimal read voltage may be represented as:

$$s \approx \sqrt{(\mu_i - \mu_{i-1})^2} = \mu_i - \mu_{i-1},$$

$$\mu_i > \mu_{i-1}.$$

Further, the functional relationship between the check node error rate and the bit error rate is established:

$$R_{O_i} = c_{i-1}\mu_{i-1} + c_i\mu_i$$

$$c_{i-1} = \frac{\sigma_i}{\sigma_{i-1} + \sigma_i},$$

$$c_i = \frac{\sigma_{i-1}}{\sigma_{i-1} + \sigma_i}.$$

In a check matrix H of LDPC, bit with 1 in an $i^{th}$ row in H constitutes an $i^{th}$ parity check equation, and is also an $i^{th}$ check node in a Tanner graph. A probability $R_{C_i}$ of an error in the $i^{th}$ check equation may be calculated by:

$$R_{C_i} = \frac{1}{2} - \frac{1}{2}\prod_{i=0}^{d_i-1}(1 - 2 \cdot Pe).$$

In the formula, $P_e$ is a probability of an error in a single bit in an ECC codeword and is also an original error rate of the read data, and $d_i$ is the number of 1s in the $i^{th}$ row of the H matrix.

H is set to a matrix with m rows and n columns. Therefore, the number of check equations in ECC constituted by a null space of the H matrix is m (that is, the number of the check nodes in the Tanner graph is m). Then, an average error probability of the m check equations, that is, the check node error rate, may be calculated by:

$$R_C = \frac{R_{C_1} \cdot d_1 + R_{C_2} \cdot d_2 +, \ldots, + R_{C_m} \cdot d_m}{d_1 + d_2 +, \ldots, + d_m}$$

For example, if the number of 1s in each row of the H matrix is the same, that is, $d_1 = d_2 = \ldots = d_m = d$, the check node error rate may be simplified as:

$$R_C = R_{C_i} = \frac{1}{2} - \frac{1}{2}\prod_{i=0}^{d-1}(1 - 2 \cdot Pe).$$

Based on the above-mentioned calculation, the functional relationship between the check node error rate and the bit error rate may be obtained.

Figure 4:
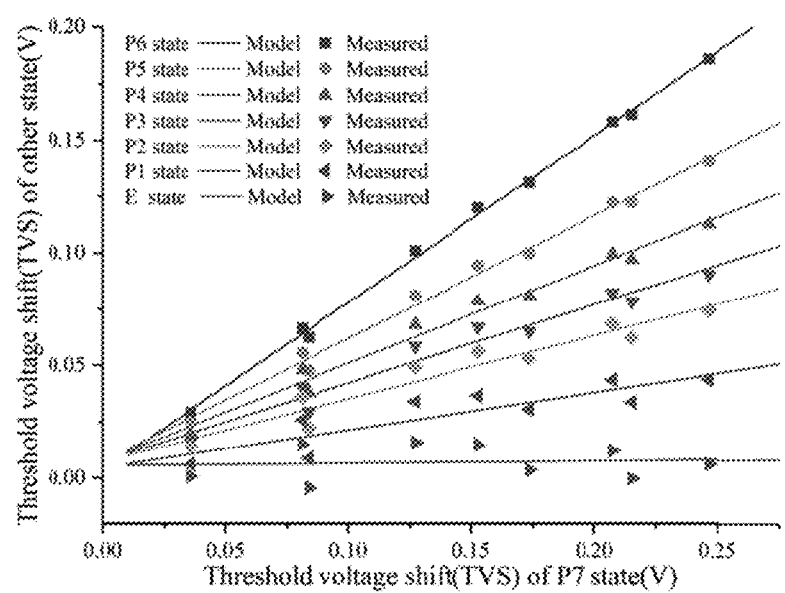
FIG. 4 schematically shows a curve diagram of a linear functional relationship between an $i^{th}$ threshold voltage offset $\Delta V_{T_i}$ and a $j^{th}$ threshold voltage offset $\Delta V_{T_j}$ according to an embodiment of the present disclosure.

The functional relationship between the bit error rate and the read voltage adjustment step size is established:

In such embodiments, as shown in FIG. 4, a linear functional relationship is provided between an $i^{th}$ threshold voltage offset $\Delta V_{T_i}$ and a $j^{th}$ threshold voltage offset $\Delta V_{T_j}$, which is shown as follows:

$$\Delta V_{T_i} = l_{i,j}(\Delta V_{T_j})$$

A linear functional relationship is provided between an $i^{th}$ read voltage adjustment step size (decision distance) $D_{R_i}$ and the $i^{th}$ threshold voltage offset $\Delta V_{T_i}$, which is shown as follows:

$$D_{R_i} = l_{D_i}(\Delta V_{T_i})$$

According to the above-mentioned two linear relationships, the functional relationship between the bit error rate and the read voltage adjustment step size may be calculated as:

$$Pe = Pe_{\sigma_{i-1},\sigma_i}(l_{D_i}^{-1}(D_{R_i}))$$

Figure 5:
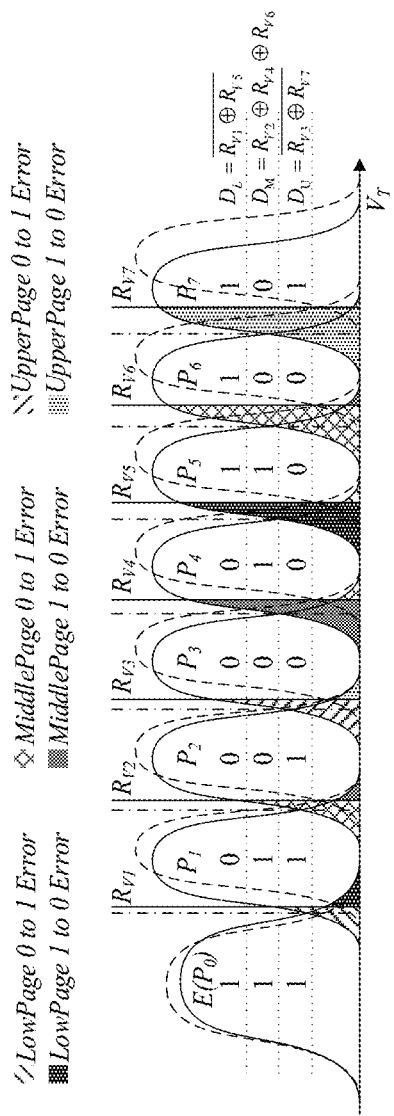
FIG. 5 schematically shows a diagram of a threshold voltage distribution state of a TLC NAND flash memory according to an embodiment of the present disclosure.

Similarly, as shown in FIG. 5, for a TLC NAND flash memory, the functional relationship between the bit error rate of a Low Page and the read voltage adjustment step size is as follows:

$$Pe_L = Pe_{\sigma_0,\sigma_1}(\Delta V_{T_1}) + Pe_{\sigma_4,\sigma_5}(\Delta V_{T_5})$$

$$= Pe_{\sigma_0,\sigma_1}(l_{1,5}(\Delta V_{T_5})) + Pe_{\sigma_4,\sigma_5}(\Delta V_{T_5})$$

$$= Pe_{\sigma_0,\sigma_1}(l_{1,5}(l_{D_5}^{-1}(D_{R_5}))) + Pe_{\sigma_4,\sigma_5}(l_{D_5}^{-1}(D_{R_5})).$$

The functional relationship between the bit error rate of a Middle Page and the read voltage adjustment step size is as follows:

$$Pe_M = Pe_{\sigma_1,\sigma_2}(l_{2,6}(\Delta V_{T_6})) + Pe_{\sigma_3,\sigma_4}(l_{4,6}(\Delta V_{T_6})) + Pe_{\sigma_5,\sigma_6}(\Delta V_{T_6})$$

$$= Pe_{\sigma_1,\sigma_2}(l_{2,6}(l_{D_6}^{-1}(D_{R_6}))) + Pe_{\sigma_3,\sigma_4}(l_{4,6}(l_{D_6}^{-1}(D_{R_6}))) +$$

$$Pe_{\sigma_5,\sigma_6}(l_{D_6}^{-1}(D_{R_6})).$$

The functional relationship between the bit error rate of an Upper Page and the read voltage adjustment step size is as follows:

$$Pe_U = Pe_{\sigma_2,\sigma_3}(l_{3,7}(\Delta V_{T_7})) + Pe_{\sigma_6,\sigma_7}(\Delta V_{T_7})$$
$$= Pe_{\sigma_2,\sigma_3}(l_{3,7}(l_{D_7}^{-1}(D_{R_7}))) + Pe_{\sigma_6,\sigma_7}(l_{D_7}^{-1}(D_{R_7})).$$

In operation S202, a functional relationship between the check node error rate and the read voltage adjustment step size is established according to the functional relationship between the check node error rate and the bit error rate and the functional relationship between the bit error rate and the read voltage adjustment step size.

Figure 6:
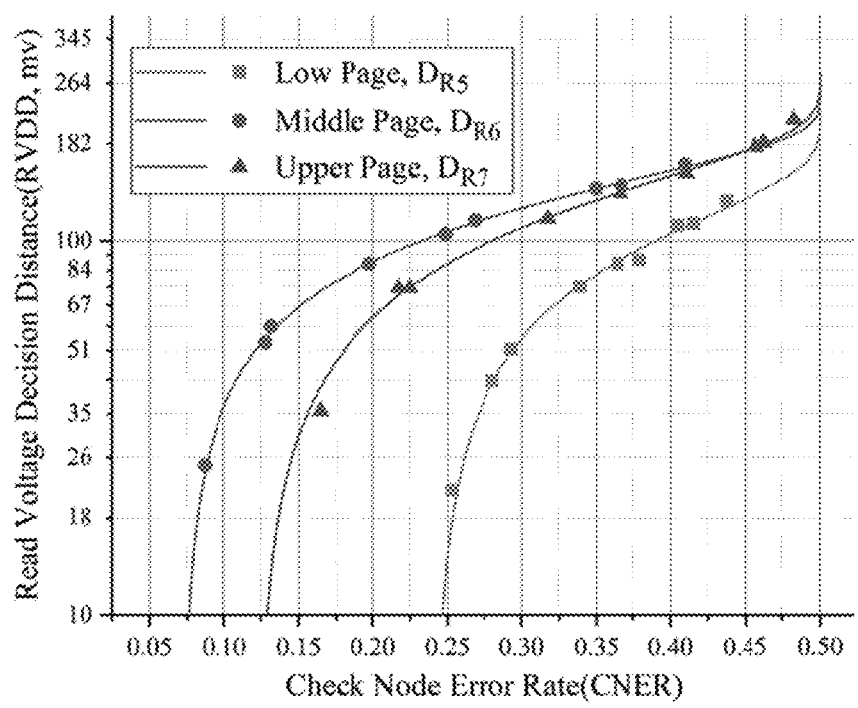
FIG. 6 schematically shows a curve diagram of a functional relationship between a check node error rate and a read voltage adjustment step size according to an embodiment of the present disclosure.

In an embodiment of the present disclosure, the established functional relationship between the check node error rate and the read voltage adjustment step size is shown in FIG. 6.

In operation S203, the read voltage adjustment step size is calculated according to the functional relationship between the check node error rate and the read voltage adjustment step size.

The functional relationship between the check node error rate and the read voltage adjustment step size may be quantized into a lookup table (LUT), and the read voltage adjustment step size may be obtained by looking up the lookup table.

Based on the above-mentioned calculation method of the check node error rate, the bit error rate and the functional relationship, an accuracy of the check node error rate and the bit error rate corresponding to each page of data may be guaranteed, and then a precision of the data recovery may be guaranteed.

According to embodiments of the present disclosure, when the read voltage corresponding to the minimum check node error rate is selected to read the data from the flash memory so as to perform the data recovery, the data recovery is performed on the read data by using an error correcting code.

Figure 7:
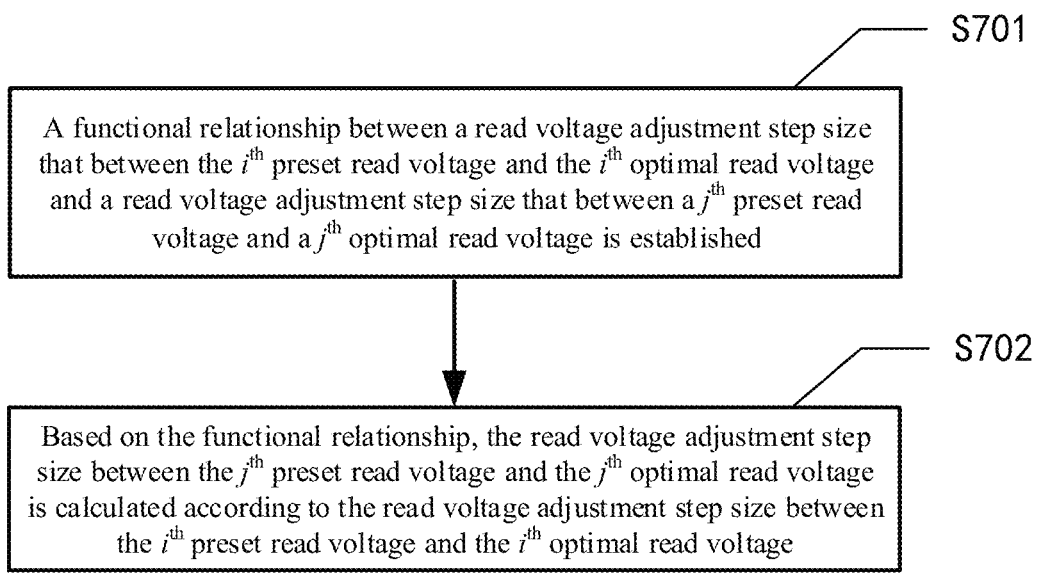
FIG. 7 schematically shows a flowchart of a data recovery method for a flash memory according to another embodiment of the present disclosure.

FIG. 7 schematically shows a flowchart of a data recovery method for a flash memory according to another embodiment of the present disclosure.

As shown in FIG. 7, the data recovery method provided by such embodiments may further include operations S701 to S702.

In operation S701, a functional relationship between a read voltage adjustment step size that between the $i^{th}$ preset read voltage and the $i^{th}$ optimal read voltage and a read voltage adjustment step size that between a $j^{th}$ preset read voltage and a $j^{th}$ optimal read voltage is established.

In operation S702, based on the functional relationship, the read voltage adjustment step size between the $j^{th}$ preset read voltage and the $j^{th}$ optimal read voltage is calculated according to the read voltage adjustment step size between the $i^{th}$ preset read voltage and the $i^{th}$ optimal read voltage.

For example, for the TLC NAND flash memory, seven read voltages of the TLC NAND flash memory may be adjusted. Specifically, for a Low Page, $D_{R_1}$ needs to be calculated based on $D_{R_5}$; for a Middle Page, $D_{R_2}$ and $D_{R_4}$ need to be calculated based on $D_{R_6}$.

The method may quickly adjust other read voltage adjustment step sizes based on a read voltage adjustment step size.

Figure 8:
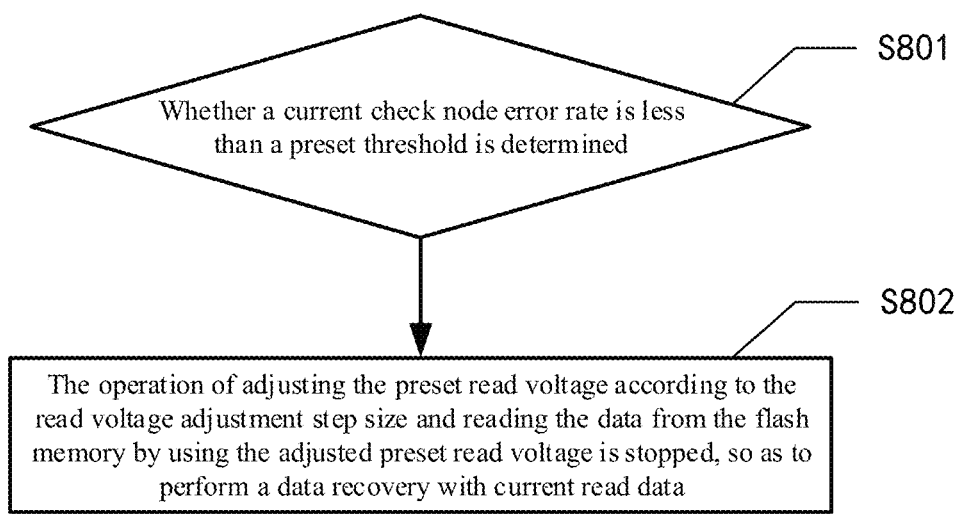
FIG. 8 schematically shows a flowchart of a data recovery method for a flash memory according to yet another embodiment of the present disclosure.

FIG. 8 schematically shows a flowchart of a data recovery method for a flash memory according to yet another embodiment of the present disclosure.

As shown in FIG. 8, the data recovery method provided by such embodiments may further include operations S801 to S802.

In operation S801, whether a current check node error rate is less than a preset threshold is determined.

If the current check node error rate is less than the preset threshold, operation S802 is performed.

Figure 9:
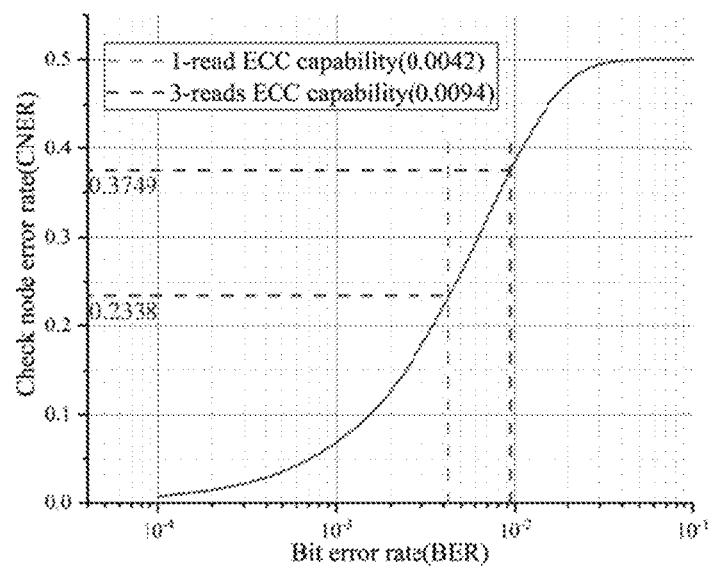
FIG. 9 schematically shows a curve diagram of a monotonic functional relationship between a check node error rate and a bit error rate according to an embodiment of the present disclosure.

According to embodiments of the present disclosure, as shown in FIG. 9, a monotonic functional relationship is provided between the check node error rate and the bit error rate. Therefore, the bit error rate may be replaced with the check node error rate, and a size of the check node error rate may be used to determine whether the read data may be corrected by the ECC. When the check node error rate of the read data is less than a certain value, a read data error may be corrected by the ECC. For example, in a specific example, the check node error rate is less than 0.2338, which may be corrected by an ECC hard decision decoding, and the check node error rate is less than 0.3749, which may be corrected by an ECC soft decision decoding.

In operation S802, the operation of adjusting the preset read voltage according to the read voltage adjustment step size and reading data from the flash memory by using the adjusted preset read voltage is stopped, so as to perform a data recovery with current read data.

The data recovery method for a flash memory according to such embodiments is to add a judgment on whether the read data may be corrected by the ECC on the basis of the above-mentioned method of determining the decision distance according to the check node error rate so as to adjust the read voltage, and to stop the operation of adjusting the read voltage when it is determined that the read data may be corrected by the ECC, which may improve a system performance.

Figure 10:
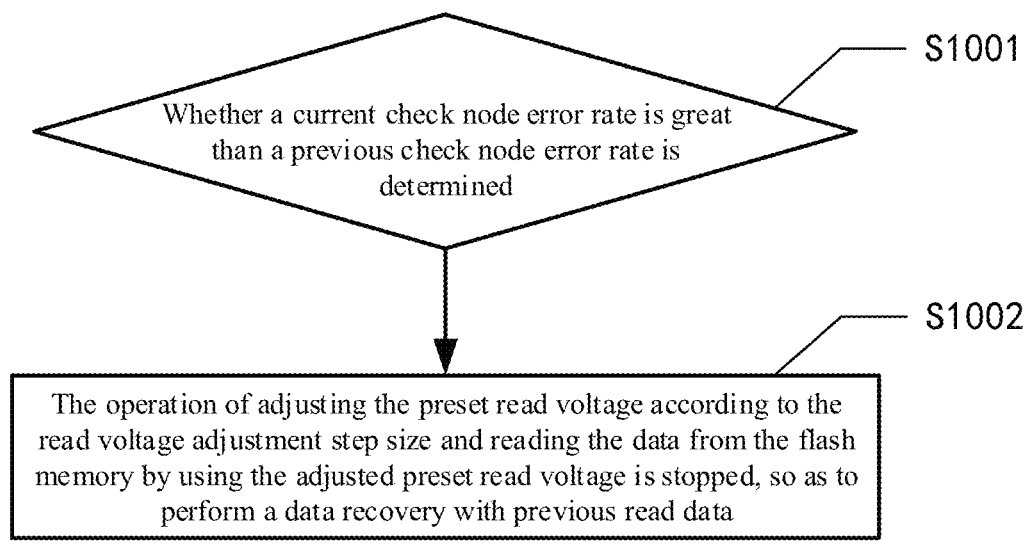
FIG. 10 schematically shows a flowchart of a data recovery method for a flash memory according to yet another embodiment of the present disclosure.

FIG. 10 schematically shows a flowchart of a data recovery method for a flash memory according to yet another embodiment of the present disclosure. As shown in FIG. 10, the data recovery method provided by such embodiments may further include operations S1001 to S1002.

In operation S1001, whether a current check node error rate is greater than a previous check node error rate is determined.

The current check node error rate is greater than the previous check node error rate, which indicates that an error rate of the currently read data is higher than an error rate of a previously read data, and a read voltage of the previously read data is the optimal read voltage. Therefore, when the current check node error rate is greater than the previous check node error rate, operation S1002 is performed.

In operation S1002, the operation of adjusting the preset read voltage according to the read voltage adjustment step size and reading the data from the flash memory by using the adjusted preset read voltage is stopped, so as to perform a data recovery with previous read data.

The data recovery method for a flash memory according to such embodiments is to add a judgment on whether the read data may be corrected by the ECC on the basis of the above-mentioned method of determining the decision distance according to the check node error rate so as to adjust the read voltage, and to stop the operation of adjusting the read voltage when it is determined that the read data may be corrected by the ECC, which may improve the system performance.

Figure 11:
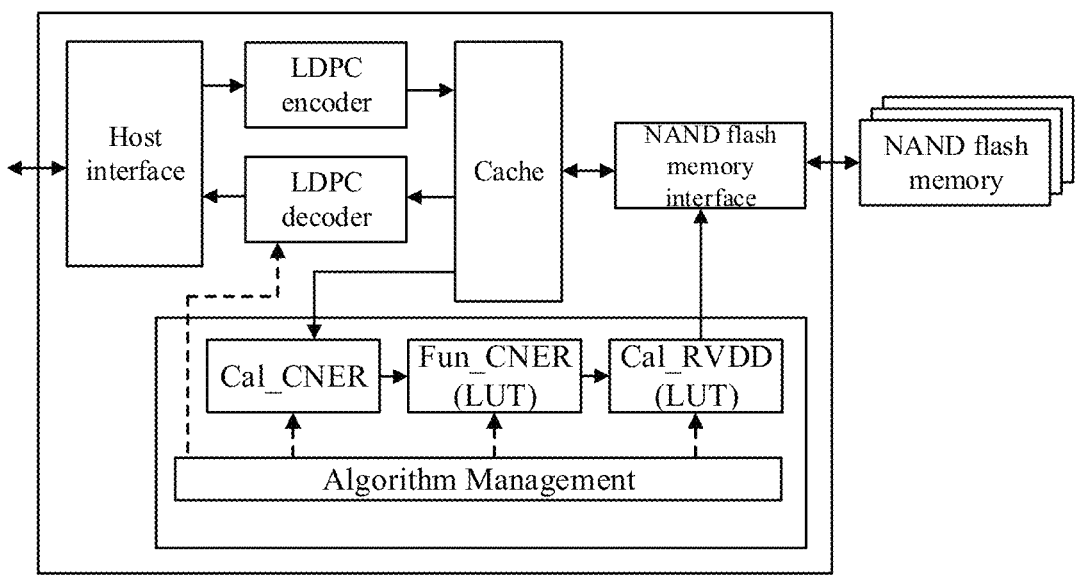
FIG. 11 schematically shows a structural diagram of a data recovery system for a flash memory according to an embodiment of the present disclosure.

FIG. 11 schematically shows a structural diagram of a data recovery system for a flash memory according to an embodiment of the present disclosure.

As shown in FIG. 11, the system mainly includes:
a check node error rate calculation circuit (Cal_CNER) which is used to calculate a check node error rate corresponding to calculated data;

a lookup table circuit (Fun_CNER) for finding a decision distance according to a check node error rate, which is used to calculate a read voltage adjustment step size according to the check node error rate and a bit error rate; and a lookup table circuit (Cal_RVDD) for a functional relationship between an $i^{th}$ decision distance and a $j^{th}$ decision distance, which is used to calculate a read voltage adjustment step size between a $j^{th}$ preset read voltage and a $j^{th}$ optimal read voltage according to a read voltage adjustment step size between an $i^{th}$ preset read voltage and an $i^{th}$ optimal read voltage.

Details not covered in the device embodiments will not be repeated here, please refer to the method embodiments.

It should be noted that the check node, also called a check equation, is a parity check equation composed of positions 1 in each row of the check matrix of the ECC. The concept of the check node error rate in embodiments of the present disclosure includes both the concept of the check node error rate itself and the concept of the check equation. If the read voltage is adjusted by using a functional relationship between the check equation and the decision distance, it should be included in the scope of protection of the present disclosure.

Although the present disclosure has been described through specific embodiments with reference to the accompanying drawings, those skilled in the art will easily recognize that the above-mentioned embodiments are only exemplary and used to describe the principles of the present disclosure, which will not limit the scope of the present disclosure. Those skilled in the art may make various combinations, modifications and equivalent substitutions to the above-mentioned embodiments without departing from the spirit and scope of the present disclosure.

What is claimed is:

1. A data recovery method for a flash memory, comprising:

reading data from the flash memory by using a preset read voltage;

calculating a check node error rate corresponding to the data;

calculating a read voltage adjustment step size according to the check node error rate;

adjusting the preset read voltage according to the read voltage adjustment step size and reading data from the flash memory by using the adjusted preset read voltage, and repeating the operation of calculating a check node error rate corresponding to the data to the operation of adjusting the preset read voltage according to the read voltage adjustment step size and reading data from the flash memory by using the adjusted preset read voltage, until the check node error rate is minimum; and selecting a read voltage corresponding to the minimum check node error rate to read data from the flash memory, so as to perform a data recovery.

2. The data recovery method for a flash memory according to claim 1, further comprising:

determining whether a current check node error rate is less than a preset threshold; and in response to the current check node error rate being less than the preset threshold, stopping the operation of adjusting the preset read voltage according to the read voltage adjustment step size and reading data from the flash memory by using the adjusted preset read voltage, so as to perform a data recovery with current read data.

3. The data recovery method for a flash memory according to claim 1, further comprising:

determining whether a current check node error rate is greater than a previous check node error rate, and in response to the current check node error rate being greater than the previous check node error rate, stopping the operation of adjusting the preset read voltage according to the read voltage adjustment step size and reading data from the flash memory by using the adjusted preset read voltage, so as to perform a data recovery with previous read data.

4. The data recovery method for a flash memory according to claim 1, wherein the calculating a check node error rate corresponding to the data comprises:

calculating the check node error rate according to a formula:

$$R_C = \text{sum}(H \cdot D_k)/m$$

where $R_C$ is the check node error rate, H is a parity check matrix, $D_k$ is data of a read codeword, and m is the number of check nodes.

5. The data recovery method for a flash memory according to claim 1, wherein the calculating a read voltage adjustment step size according to the check node error rate comprises:

establishing a functional relationship between the check node error rate and a bit error rate and a functional relationship between the bit error rate and the read voltage adjustment step size, based on a threshold voltage distribution state of the flash memory;

establishing a functional relationship between the check node error rate and the read voltage adjustment step size according to the functional relationship between the check node error rate and the bit error rate and the functional relationship between the bit error rate and the read voltage adjustment step size; and calculating the read voltage adjustment step size according to the functional relationship between the check node error rate and the read voltage adjustment step size.

6. The data recovery method for a flash memory according to claim 5, wherein the establishing a functional relationship between the check node error rate and a bit error rate and a functional relationship between the bit error rate and the read voltage adjustment step size comprises:

calculating a bit error rate corresponding to the preset read voltage, wherein the calculating a bit error rate corresponding to the preset read voltage comprises: calculating the bit error rate according to a formula:

$$P_e = G_{\sigma_{i-1}}(R_{V_i} - \mu_{i-1}, +\infty) + G_{\sigma_i}(-\infty, R_{V_i} - \mu_i)$$

where $P_e$ is the bit error rate, i is a serial number of the threshold voltage distribution state, $R_{V_i}$ is an $i^{th}$ preset read voltage, $\mu_i$ is a mean value of an $i^{th}$ threshold voltage distribution state of the flash memory, $\mu_{i-1}$ is a mean value of an $(i-1)^{th}$ threshold voltage distribution state of the flash memory, $G_{\sigma_{i-1}}$ is a distribution function of Gaussian distribution corresponding to the threshold voltage distribution state with a mean value of 0 and a variance of $\sigma_{i-1}$, and $G_{\sigma_i}$ is a distribution function of Gaussian distribution with a mean value of 0 and a variance of $\sigma_i$.

7. The data recovery method for a Dash memory according to claim 5, further comprising:
quantizing the functional relationship between the check node error rate and the read voltage adjustment step size into a lookup table, and obtaining the read voltage adjustment step size by looking up the lookup table.

8. The data recovery method for a flash memory according to claim 6, wherein the $i^{th}$ preset read voltage and an $i^{th}$ optimal read voltage have a relationship:

$$R_{V_i} - R_{O_i} = D_{R_i}$$

where $R_{O_i}$ is the $i^{th}$ optimal read voltage, and $D_{R_i}$ is a read voltage adjustment step size between the $i^{th}$ preset read voltage and the $i^{th}$ optimal read voltage; and
the $i^{th}$ optimal read voltage is calculated by:

$$R_{O_i} = c_{i-1}\mu_{i-1} + c_i\mu_i$$
$$c_{i-1} = \frac{\sigma_i}{\sigma_{i-1} + \sigma_i},$$
$$c_i = \frac{\sigma_{i-1}}{\sigma_{i-1} + \sigma_i}$$

where $\mu_i$ is the mean value of the $i^{th}$ threshold voltage distribution state, $\sigma_i$ is a variance of the $i^{th}$ threshold voltage distribution state, $\mu_{i-1}$ is the mean value of the $(i-1)^{th}$ threshold voltage distribution state, and $\sigma_{i-1}$ is a variance of the $(i-1)^{th}$ threshold voltage distribution state.

9. The data recovery method for a flash memory according to claim 8, further comprising:
establishing a functional relationship between a read voltage adjustment step size that between the $i^{th}$ preset read voltage and the $i^{th}$ optimal read voltage and a read voltage adjustment step size that between a $j^{th}$ preset read voltage and a $j^{th}$ optimal read voltage; and
calculating, based on the functional relationship, the read voltage adjustment step size between the $j^{th}$ preset read voltage and the $j^{th}$ optimal read voltage according to the read voltage adjustment step size between the $i^{th}$ preset read voltage and the $i^{th}$ optimal read voltage.

10. The data recovery method for a flash memory according to claim 1, wherein the selecting a read voltage corresponding to the minimum check node error rate to read data from the flash memory so as to perform a data recovery comprises:
performing the data recovery on the read data by using an error correcting code.

\* \* \* \* \*